United States Patent [19]

Miller

[11] Patent Number: 5,490,249
[45] Date of Patent: Feb. 6, 1996

[54] AUTOMATED TESTING SYSTEM

[75] Inventor: Christopher M. Miller, Saratoga, Calif.

[73] Assignee: Taligent, Inc., Cupertino, Calif.

[21] Appl. No.: 310,455

[22] Filed: Sep. 22, 1994

Related U.S. Application Data

[63] Continuation of Ser. No. 996,047, Dec. 23, 1992.

[51] Int. Cl.$^6$ ............................................. G06F 11/00
[52] U.S. Cl. ........................ 395/183.14; 395/183.15; 395/183.02; 364/221.7; 364/243.3; 364/274.1; 364/274.2; 364/282.1
[58] Field of Search ........................ 395/575, 600, 395/500, 650, 700, 183.14, 183.15, 183.02; 364/222.81, 282.1, 221.7, 243.3, 266, 265, 267, 274.1, 274.2; 371/19, 16.5, 15.1

[56] References Cited

U.S. PATENT DOCUMENTS

| | | | |
|---|---|---|---|
| 4,821,220 | 4/1989 | Duisberg | 364/578 |
| 5,136,705 | 8/1992 | Stubbs et al. | 395/575 |
| 5,241,673 | 8/1993 | Schelvis | 395/600 |
| 5,259,766 | 11/1993 | Sack et al. | 433/362 |
| 5,280,610 | 1/1994 | Travis, Jr. et al. | 395/600 |
| 5,283,900 | 2/1994 | Frankel et al. | 395/700 |
| 5,291,593 | 3/1994 | Abraham et al. | 395/600 |
| 5,293,385 | 3/1994 | Hary | 371/19 |
| 5,297,279 | 3/1994 | Bannon et al. | 395/600 |
| 5,305,389 | 4/1994 | Palmer | 395/425 |
| 5,307,490 | 4/1994 | Davidson et al. | 395/650 |
| 5,327,529 | 7/1994 | Fults et al. | 395/700 |
| 5,327,559 | 7/1994 | Priven et al. | 395/700 |
| 5,339,433 | 8/1994 | Frid-Nielsen | 395/700 |
| 5,371,747 | 12/1994 | Brooks et al. | 371/19 |

*Primary Examiner*—Robert W. Beausoliel, Jr.
*Assistant Examiner*—Dieu-Minh Le
*Attorney, Agent, or Firm*—Keith Stephens

[57] ABSTRACT

A method and apparatus for testing software programs systematically explores valid call sequences using a collection of data with a software program comprising a collection of subroutine components. Instead of writing unit tests, the subject invention provides tools to develop precondition rules which systematically remove from the data collection, data which is syntactically incorrect for proper operation with the software program and then data which is semantically incorrect for the software program. The resulting reduced data collection is applied to the collection of components to generate output values which are then checked against postcondition rules to verify that the software program operated correctly. The test method and apparatus are implemented in object-oriented technology to allow test engineers to quickly and easily develop invariants, precondition rules and postcondition rules which are used to test the software program.

7 Claims, 7 Drawing Sheets

```
class TObjectInvariant : public TDataInvariant
public:
        virtual Boolean   Test (const TDatum&);
        virtual Boolean   IsValidNonNi1OjbjectPointer
                          (const. void*) const;

class TCollectibleInvariant : public TDataInvariant
public:                                                    300
        virtual Boolean   Test (const TDatum&);            /
        virtual Boolean   IsEqualToItself (const MCollectible&)
                          const;
        virtual Boolean   DoStreamingCheck(const
                          McCollectible&) const;

class TCollectionInvariant : public TDataInvariant
public:                                                    310
        virtual Boolean   Test(const TDatum&);             /
        virtual Bong      GetIterateCount (const TCollection& )
                          const;
        virtual Boolean   DoContentsInvariancyCheck (const
                          TCollection&) const.
```

FIGURE 3

```
Boolean TObjectInvariant::Test (const TDatum& datum
    (const void* object = (void*) datum.GetData ();
    if (object == NIL)                          400
        return FALSE;// pointer is NIL
    if (IsValidNonNilObject Pointer (object) )
        return FALSE;// non-zero pointer isn't valid
    return TRUE;// we passed all our intra-invariant checks;

Boolean TCollectibleInvariant::IsEqualToItself (const
    McCollectible& object) const (return collectible.IsEqual
    (object) // is object equal to itself?

Boolean TCollectibleInvariant::Test (const TDatum& datum) (
    const McCollectible* object = (McCollectible*)
    datum.Get Data ();
    if (!IsEqualToItself(*object))
        return FALSE;// object not equal to itself
    if (collectible- >GetClass Name() == NIL )
        return FALSE;//object lacks class name
    if ( !DoContentsInvariancyCheck(*object))
        return FALSE;//found a streaming problem
    return TRUE;  // we passsed all our intra-invariant
                        checks;

long TColectionInvariant::GetIterateCount
    (const TCollection& c) (TIterator* i = c.CreateIterator();
    McCollectible*m;long n=0;            410
    for (m=i>First(); m!=NIL; m=i<Next()0 n++//count
    members    iterated over
    delete i; return n; // return the iteration count Boolean TCollectionInvariant::Test (const TDatum& datum) (
    const Tcollection* C= (TCollection*) dataum.GetData ();
    if ( GetIteratorCount(*c) !=C-.Count() )
```

FIGURE 4 class TCollectionAddPrecondition :public TFunctionCondition (
public:                                              500
    virtual Boolean  Test (TFunctionData&);
|
Boolean TCollectionAddPrecondition::Test
                            (TFunctionData& data)
    const TCollection* c = TCollection*) data.GetThis );
    const MCollectible* )McCollectible*)
        data.GetParameter(1);                     510
    const McCollectible* f = ITerator(*collection). First ()
    if ((f!=NIL) && (stromp (o->GetClassName(),f->
            GetClassName() 0 =0))
    return FALSE: //homogeneity violation
        (class names digger)
    return True   //we can add the collectible to the collection

FIGURE 5

```
class TCollectionAddPostcondition : public
TFunctionCondition
public:                              600
     virtual Boolean Test(TFunctionData&);

Boolean TCollectionAddPostcondition::Test( TFunctionData&
                                           data ) (
     const TCollection* c = (TCollection*) data.GetThis ();
     const McCollectible* o = (McCollectible*)
                                    data.GetParameter(1);
     const McCollectible* f = TIterator(*collection).First();
                                                  610
     if (c->Member(*) == FALSE)
          return FALSE;    //collectible is not in the collection long postAddCount = c->Count();
     Boolean countDecreased = (postAddCount< gPreCount);
     Boolean countIncreasedMoreThan1 = (postAddCount >
     (gPreCount + 1));

if (!gWasMember && postAddCount!=(gPreCount+1))
     return FALSE; //count should have incremented if (gWasMember &&
     (countDecreased || countIncreasedMoreThan1))
          return FALSE;   // count should not have decreased or
                              increased more than 1
     return TRUE;    // all our assertions passed.
```

AUTOMATED TESTING SYSTEM

This application is a continuation of application Ser. No. 07/996,047 filed Dec. 23, 1992.

FIELD OF THE INVENTION

This invention generally relates to improvements in test systems for testing software applications and more particularly to automating the test process for testing software applications.

BACKGROUND OF THE INVENTION

Among developers of workstation software, one of the most pressing requirements is for a software reliability program which can automatically test each of the components of a software application and identify problems, sometimes referred to as "bugs", in the application, and report the problems. To date, this processing is tedious and performed by a team of persons who identify test sequences and perform the tests on the software application.

Some attempts have been made at interactively debugging programs by setting break points and other traps in an application and observing the application as it executes. This approach was patented by DEC in U.S. Pat. No. 4,589,068. However, this approach could not test the unique characteristics of each subroutine/function of a software application and resulted in incomplete test operations.

SUMMARY OF THE INVENTION

Accordingly, it is a primary objective of the present invention to automate the testing of a software application. A computer system is employed to input design specifications for each of the subroutines that make up a software application that is to be the target of a test and the express preconditions and postconditions based on the design specifications. Internal databases are constructed to maintain target type relationships, subroutine declaration syntax and data requirements, condition-subroutine associations, and invariant-type associations.

The preconditions and postconditions are compiled and link edited into a shared library and mapped to the particular subroutine. Then, once the databases have been loaded, wrappers are created to generate the source code for functions employed by the invention to perform actual target subroutine calls. The source code is written to a text file on a disk. The wrapper source code must be compiled and link edited into the shared library containing the precondition, postcondition and invariant subroutines.

During testing, the invention loads parameter data for each subroutine selected for test. Then, for all data instances defined for each of the subroutines to be tested, an invariant function is performed and the resulting data is checked to ascertain its validity. If the data is invalid, then it is reported. However, if the data is not invalid, then the next data instance is performed until all data instances have been performed for each of the subroutines.

Each subroutine is next called with a precondition. if the precondition is true, then the subroutine is called with data from each of the predefined data instances. For each of the instances, if the data is valid, then the next instance is invoked. However, if the data is invalid, then the invalid data is reported. The same processing is performed for each of the subroutines on the postconditions and similar exception processing is reported. In this manner, every subroutine of an application can be automatically tested and exceptions noted for any instance, precondition and postcondition.

DETAILED DESCRIPTION OF THE INVENTION

Figure 1:
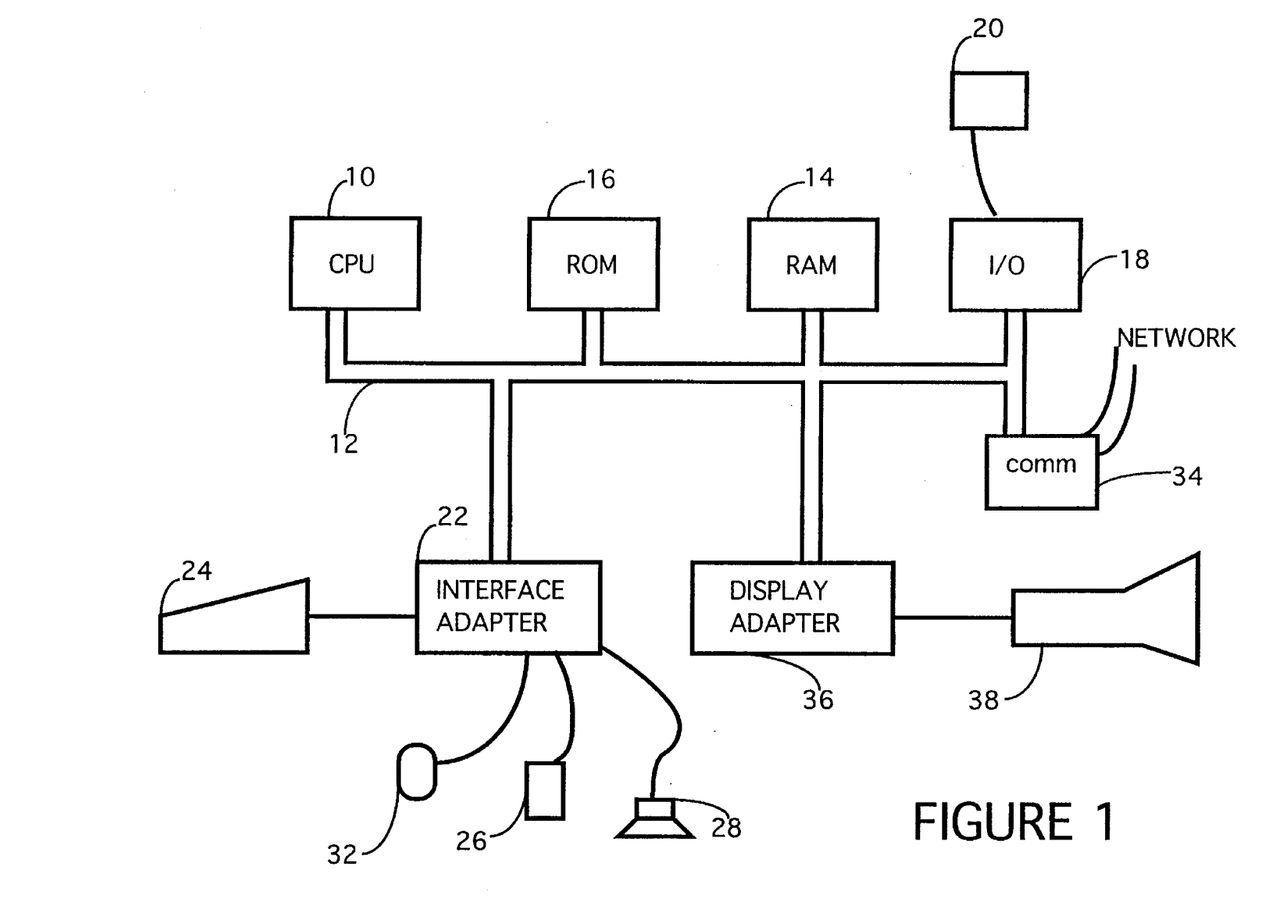
FIG. 1 is a block diagram of a personal computer system in accordance with the subject invention.

The invention is preferably practiced in the context of an operating system resident on a personal computer such as the IBM PS/2 or Apple Macintosh computer. A representative hardware environment is depicted in FIG. 1, which illustrates a typical hardware configuration of a workstation in accordance with the subject invention having a central processing unit 10, such as a conventional microprocessor, and a number of other units interconnected via a system bus 12. The workstation shown in FIG. 1 includes a Random Access Memory (RAM) 14, Read Only Memory (ROM) 16, an I/O adapter 18 for connecting peripheral devices such as disk units 20 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to a display device 38. The workstation has resident thereon an operating system such as the IBM OS/2 operating system or the Apple OPUS operating system.

Issues

There are a number of unresolved issues in prior art software reliability testing which must be addressed to improve the quality strategy and testing systems. The following issues are addressed by the subject invention and a preferred embodiment of the invention solving each of the issue is presented below.

Reliability

The term reliability has many definitions. However, for purposes of the subject invention, the following definition is incorporated, "the probability of failure-free operation of a computer program for a specified time in a specified environment." Software Reliability represents the proven ability of an implementation to agree with its specification. Reliability must be subject to objective measurements—hence use of the word probability—based upon repeated executions of software under real-world operating conditions which satisfy design specifications. This implies that reliability of any software component can and must be objectively represented using measures of software as they are presented below.

Software reliability depends on a failure-free, computer program, at a specified time, and in a specified environment. It is necessary that all our definitions be resolvable down to concrete definitions. The following are definitions of those terms within the context of measuring the reliability of an application program's interface (API):

failure-free—observed operation does not disagree with API specification.

computer program—API implementation under test specified time—time spent within explicit API function calls during test specified environment—states and actions which do not disagree with API specification.

Note the deliberate use of "do not disagree" rather than "do agree". This is because any reasonable action which is not explicitly disallowed by a specification should be allowed. This forces design engineers and technical writers to provide thorough operating specifications for every public interface for test engineers, automated testing programs, and client developers.

Measures

Reliability is the probability that a product will operate correctly for a specified time. This statement conversely implies that the time a product will probably operate correctly is also a measure of reliability. This time measure is often expressed as mean time between failure (MTBF) which represents the average duration before a product breaks down. MTBF measures help purchasers select a product offering a superior operating life from others having similar features. Manufacturers can also use MTBF metrics to objectively determine which components in critical systems require priority attention for overall system reliability improvement.

Nearly every computer hard disk drive has an MTBF rating, but such ratings are uncommon for software. This situation is peculiar because the same techniques which provide MTBF ratings for hardware can also be directly applied to software, but virtually no software manufacturers employ MTBF. The subject invention provides the report information to generate an accurate computation of MTBF.

The first personal computer software manufacturer to offer reliability ratings for its products would be outstanding in the industry for several reasons. First, the recognition for being the first to offer such measures has substantial merit by itself. Second, the ability to measure software reliability proves that the company has a thorough and controllable software testing process.

Software reliability ratings are uncommon for speculative reasons. One reason is software is not a physical item like a hard disk drive; it cannot be picked up and measured with a scale. Another possible reason is that statistical quality control—the discipline which uses MTBF ratings— is typically taught to mechanical and electrical engineers, but not to software engineers or computer scientists. Software developers are not instructed in the importance of statistical quality control, consequently the software development profession has not widely applied it.

Measuring the reliability of hard disk drives is not difficult; randomly reading and writing until a failure occurs will suffice. However, software is much more complex than a hard disk drive. Measuring software MTBF requires generation of an operational profile which defines the function calls made during the reliability test interval.

There is a problematic reason why software MTBF measures are virtually nonexistent: nobody has yet developed a universal scheme for determining function call sequences during MTBF analysis. Calling the same unit tests repeatedly doesn't accurately represent the system's complex combinatorial possibilities. Replaying Graphical User Interface (GUI) event sequences usually activates only a small portion of the total system code. Besides, GUI actions are usually not portable between dissimilar operating systems and cannot offer fair comparisons.

Operational profile generation for reliability analysis is a challenging problem, but not an impossible one. For example, here are several steps which define an operational profile:

1. for any valid state, determine the entire domain of subroutines and parameter data which can be executed next according to a design specification;

2. choose one subroutine and corresponding parameter data from that domain;

3. execute that subroutine with its chosen parameter data;

4. perform validity checks to determine if a failure arose during the call; and 5. if no failure arose, then perform step 1), else report the failure and stop.

A variant of this scheme is commonly referred to as a random walk through. Any system which can perform random walk through with an API will have an inherent capability to perform reliability measurement. The automated testing system of the subject invention can perform random walk through for any multi-component API of arbitrary size, thus providing the inherent capability to perform MTBF measurement for most components.

The system proposed in this document offers a technological breakthrough to the entire software industry because it is possible to compare the reliability of competitive but diverse products such as Windows NT, Macintosh, and OS/2. The ability to perform random walk through offers another breakthrough in software testing—the statistical quality control technique of random sampling can now be applied to software.

Testing

Testing has historically included a range of activities from writing test cases to improving product designs. However, in many cases the exact duties of test engineers has been unclear. Unclear objectives often results in unachieved objectives. Therefore, the following objectives were developed to fashion a solution to the shortfalls of current software testing technology.

Test engineers should focus on assuring that their assigned components operate according to design specifications to ensure errors are measured, controlled, and improved throughout the product life cycle. Breaking new ground in software quality requires that test engineers include software reliability measurement in their problem domain. The traditional testing tasks can still be performed, but measuring and controlling product reliability should be recognized as their highest priority task.

Software testing involves detecting differences between design specification and implementation operation. This activity raises several questions:

How should software design be specified?

How should implementation be verified?

How well does implementation meet specification?

There are many models for representing how software should work. Some models are more appropriate than others depending on specification purpose. Since software testing involves evaluating the outcome of experimental trials, our specification model should inherently support decision evaluation. There are three important decisions in software testing:

Is state X valid?

Should future action Y work?

Did past action Z work?

Any software component can be adequately and automatically tested by consistently applying three types of criteria to software with an automated testing system. The subject invention offers concrete implementations to implement these three criteria.

Despite the relative maturity of the software industry and the investment of many dollars, fundamental questions of software testing remain unanswered, for example:

What are the test cases for function X?

Functions X1, X2, . . . XN?

What are the test cases for structure Y?

Structures Y1, Y2, . . . YN?

Has component Z been tested thoroughly?

Components Z1, Z2, . . . ZN?

Incredibly, these basic issues are still unresolved, or even worse, haphazardly addressed by test engineers in a random manner. Which explains why software is notorious for reliability problems—no two test engineers will test identical products in an identical manner and produce repeatable results. A globally unrepeatable process will also be globally inconsistent and uncontrollable.

Testing an API associated with an operating system demands a consistent process to verify correct operation of all methods and classes. For any API there should be a systematic way to define a core set of test cases which must successfully run to verify correct operation of the interface.

An ideal testing strategy should minimize human effort while maximizing the number of latent defects found in new or modified product code. It should also be designed to answer the basic problems which all test engineers face.

Measures

There are several measures for the functionality of systems which perform software testing. One measure, "effort" represents how many resources are typically required to find a defect in a product, and can be expressed in dollars or person-hours. Another measure called effectiveness represents the system's overall ability to find new bugs, and can be expressed in bugs per week. Another measure called efficiency—the ratio of effectiveness divided by effort—represents how economically defects are found, and can be expressed in dollars or hours spent finding a bug.

Efficiency measures are extremely important because they can be used for objective selection of the best among multiple systems for testing a specific product. Given many systems, the one with the highest efficiency rating is the best investment. Efficiency measures can also be used to determine when a product is ready for release; as testing efficiency drops—when more testing effort reveals fewer new defects—the product becomes demonstrably reliable.

Efficiency ratings mathematically depend on both effort and effectiveness ratings. Fortunately, effectiveness ratings are usually automatic byproducts of testing administration and can be constructed from bug database queries. Effort ratings are not so easily obtained. They are essential, but also unstandardized. Test person-hours, test cases run, or test CPU time are all plausible measures, but it is not always obvious which should be used. Useful metrics such as person-hours are not—and will probably never be—maintained by administrative or testing systems especially when test engineers are salaried or do not keep hourly work records.

Any testing system must automatically define and record testing effort because accurate evaluation of system capability and product reliability cannot occur without it. The subject invention proposes a revolutionary technique for measuring test effort.

DETAILS OF THE SUBJECT INVENTION

This section addresses issues within the context of an ideal testing system. An ideal testing system should have the following characteristics:

offer superior testing efficiency (effect effort);

perform thorough unit and integration testing;

exploit existing target syntax (headers, source, binaries); and report how, why, and where errors arose.

An ideal system must focus human effort on writing reusable descriptions of how software should work rather than generating specific test cases where software should or should not work correctly. Experience suggests that software operation can be usually described with a finite amount of human effort, whereas the theoretical number of valid and unique test cases cannot.

The following section explain the detailed implementation of the subject invention. The following are major techniques used by the subject invention:

1. generate a test domain of type-legal operations using syntactic type declarations;

2. use preconditions to prevent type-legal but design-illegal operations from that domain;

3. use selectors to choose a subroutine and data from that domain for execution;

4. use postconditions to detect invalid operations after each explicit subroutine call;

5. use invariants to detect invalid data states after each explicit subroutine call;

6. use stores to maintain data for reuse across explicit subroutine calls.

The following sections present components in detail and illustrate how these components combine to address many of the outstanding testing issues mentioned earlier. Preconditions and postconditions provide the key functionality for automated testing because they can be used to represent the specifications and verify the implementation of the API under test. Test engineers write preconditions and postconditions rather than individual test cases.

Test Domain Generation

In a generic sense, a test domain is a sequence of explicit subroutine calls and environmental conditions which constitute valid test cases for a target API. Test domains are generated by analyzing data type references declared in an API design specification. Data type references and data instance availability are employed to determine which subroutines and data are candidates for execution based upon the data types required as subroutine parameters and the actual data instances that are available.

For example, assume that TPerson and TName instances exist along with a subroutine TPerson::SetName(TName). With this information, a determination is made that SetName is a candidate for execution because instances are available which satisfy parameter type requirements.

Test domains generated using only C++ data types contain invalid test cases because data values are not considered when selecting candidate subroutines. For example, the specification for SetName might permit only certain TName values such as "John" but not "!@#$%". This example illustrates why type requirements by themselves cannot identify valid test domains. In addition to syntactical type rules, semantic rules are also required to express operation requirements that cannot be derived from syntax declarations alone.

The subject invention is a framework for testing programmatic interfaces by systematically exploring valid call sequences defined by a collection of subroutines with a collection of data. The subject invention does not explicitly write unit tests. Instead, it provides the tools to develop rules which model and verify the correct operation of software while leaving the complexities of test selection, execution, sequencing, coverage, and verification to an automated system. The number of test scenarios generated by the system depends upon cumulative execution time and is reliably independent of human effort.

There exist possibly new, obscure, or overworked terms in the context of this invention. To improve understanding and avoid project, brief descriptions of frequently used abstract terms and concepts are provided below.

syntactic protocol requirements of operation in terms of data type relationships.

semantic protocol requirements of operation beyond data type relationships.

predicate mechanism for evaluating validity and producing a true or false logical result; two types are invariants which validate states, and conditions which validate actions.

invariant mechanism for validating an observable state; invariants should minimally impact the state being observed.

condition mechanism for validating an action; two subtypes are preconditions which evaluate if future actions should operate correctly, and postconditions which evaluate if past actions did operate correctly.

precondition mechanism which determines if an action can be initiated correctly given the observable state immediately before the action.

postcondition mechanism which determines if an action completed correctly given the observable state immediately after the action.

space conceptual or physical system having one or more degrees of freedom containing closely related elements; elements within a space are generally countable, iteratable, and finite.

type space hierarchical system of data types, usually a directed acyclic graph.

function space system of typed subroutines organized by a type space.

data space system of typed data organized by a type space.

predicate space system of typed predicates organized by a type space.

test space unification of type, function, and data, spaces into a complete entity.

target focus of a test; classes, subroutines, and objects can all be targets.

step smallest topological transition in a space.

exploration one or more steps through a space; a random walk is an exploration.

function computer subroutine; two subtypes are method which requires the context of an object and procedure which does not require such a context.

method non-static member function; virtual functions are always methods.

procedure global subroutine or static member function.

defect unit of discrepancy between how software should operate and how it actually does; a 'bug that has not yet been found; a defect can cause many failures or none.

failure observable effect of one or more defects a 'bug' that has been found; unintended function results, outcomes, or effects can be failures; a 'crash' is almost always a failure.

Test scenarios are automatically generated by the system using many information types representing characteristics and protocol of the code under test. The following sections present the information required by the system to perform a test.

A primary information type is syntactic protocol which describes the formal interface of the target code from a low-level, lexical perspective. The system analyzes target code syntax to learn type relationships, class methods, and data parameters. C++ declarations are the primary source of syntactic protocol. Minimal effort is required by a test engineer to provide syntactic protocol since it is readily ascertainable from target source files and is analyzed automatically by the system's lexical parser.

The following syntactic protocol is employed by the subject invention:

```
class MCollectible{ public :
virtual Boolean        IsEqual (const MCollectible&)
const
virtual const char     GetClassName( ) const;
};
class TCollection: public MCollectible
public:
virtual MCollectible* Add (MCollectible*) = 0;
virtual MCollectible Remove(const MCollectible&)
= 0;
virtual long count ( ) const = 0;
virtual TIterator* CreateIterator ( ) const = 0;
virtual BooleanIsEqual ( ) const MCollectible&)
const;
virtual const char GetClassName ( ) const;
class TIterator (
public:
    virtual MColleetible*First ( ) = 0;
    virtual MColleetible*Next ( ) = 0;
);
```

From these declarations it is clear that MCollectible is a base class for common objects and provides an object comparison and most derived class name access methods. TCollection is an abstract base class which defines the protocol for collections and it also inherits the protocol of MCollectible. We know that execution of TCollection::Add requires two objects, an implicit TCollection object which represents the context of the virtual Add method and an MCollectible object to be added to the collection. It is also clear that Add may return an MCollectible* as a function result. We can determine the number of members in a TCollection using Count, and we can iterate over members in a TCollection using the protocol defined by TIterator, an abstract base class which defines the protocol for iterating over collections.

Although these class declarations describe a substantial amount of the protocol to correctly add an MCollectible to a TCollection, additional semantic protocols are required to correctly add an arbitrary collectible to an arbitrary collection in all cases. Since semantic protocol cannot be derived directly from a target syntax, it is instead expressed using objects developed by test engineers.

Semantic Protocol

Another type is semantic protocol which describes how the target code should operate from a high level, operational perspective. Semantic protocol describes the high-level operation of target code which cannot be obtained from a target syntax alone.

Common sources of abstract semantic protocol are external requirements specifications, programmer documentation, and even source code comments. Programming languages sometimes contain formal constructs for the representation of a semantic protocol. Since C++ lacks semantic constructs, the subject invention uses objects of special classes to represent and evaluate semantic protocol.

Target code semantic protocol is obtained from an analysis of programmer's documentation, external requirements specifications, and so forth. For the previous example classesMCollectible and TCollection assume there are two semantic rules which must be followed: MCollectibles being compared using IsEqual must have parameter MCollectibles having identical type as this, and non-empty TCollections can only contain MCollectibles having identical type. These semantic rules disallow IsEqualing a TFoo to a TBar, or Adding a TFoo to a TCollection already containing one or more TBars even though both TFoo and TBar are MCollectibles. Although MCollectible::IsEqual and TCollection::Add syntactically specify MCollectible*parameters, not all MCollectibles can be IsEqualed or Added according to the semantic protocol of the example classes. This example illustrates why semantic protocol must be provided to an automated testing system to augment the syntactic protocol which by itself is insufficient to describe correct target code operation. Semantic protocol is represented using predicates to evaluate the semantic protocol of target code.

Predicates

Abstractions which represent semantic protocol are called predicates. In an abstract sense predicates are expressions of operational correctness which can be evaluated to a logical result of true or false. A result of true represents semantic validity (i.e. something could work or did work), and false represents semantic invalidity (i.e. something should not work or did not work). In the concrete context of the subject invention, predicate objects perform evaluations to determine the correctness of the states of an object and the operation of subroutines.

Figure 2:
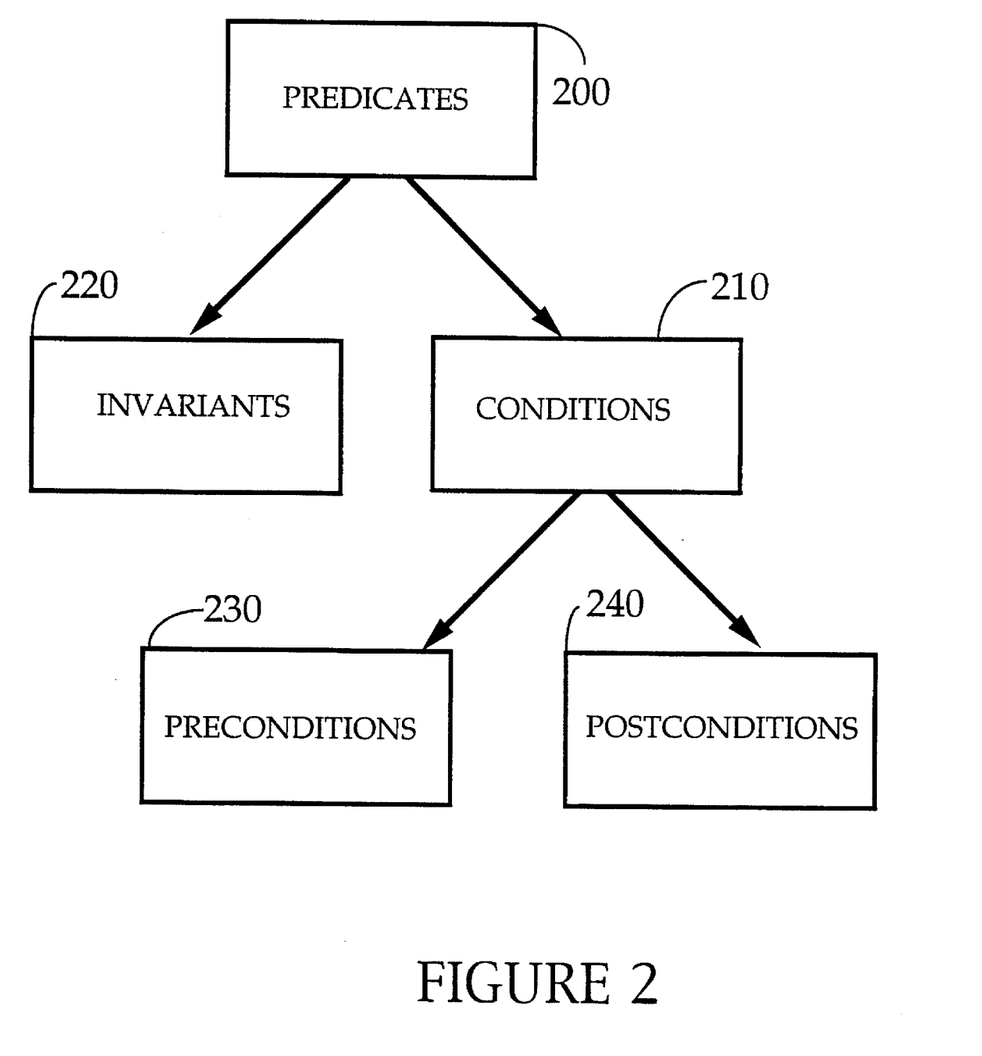
FIG. 2 is a hierarchical drawing of the subject inventions processing hierarchy in accordance with the subject invention.

There are two important predicate subtypes: invariants which validate target states and conditions which validate target actions. Test engineers write invariants for target objects and pre and postconditions for target methods. FIG. 2 illustrates with a block diagram the taxonomy of abstract predicates evaluating semantic protocol. Block 200 contains the highest level or Predicates. Predicates 200 are either Invariants 220 or Conditions 210. Conditions are either Preconditions 230 or Postconditions 240. Engineers must create predicate classes which represent the semantic protocol for the target classes and functions. The predicates are developed by subclassing from TDataInvariant, TFunctionCondition classes and overriding the Test method of the superclasses.

Invariants

Invariants are predicates which assert target states or characteristics should remain constant for correct target operation. For example, object invariants determine if the state of objects agree with their correct design and intended operation. Object invariants are frequently used by the system to determine if target objects used in test scenarios are valid or have been somehow corrupted during the test activity.

Invariants are evaluated whenever test targets are affected directly or indirectly by a test scenario. Test engineers write invariants which validate object states rather than write unit tests. Example invariants might assert the following:

o an object pointer actually refers to a valid object
  o all object references contained within an object are references to valid objects
  o a system resource exists and is available for use Objects under test can be assigned any number of invariants limited only by system resources. The subject invention causes subtype objects to automatically inherit invariants assigned to their supertypes. For example, whenever a TSet is checked for invariance, the invariant for generic C++ is first evaluated, then the MCollectible invariant is evaluated, followed by the TCollection invariant evaluation, and finally the TSet invariant is evaluated. Evaluation of multiple invariants is terminated immediately after the first semantic violation.

Figure 3:
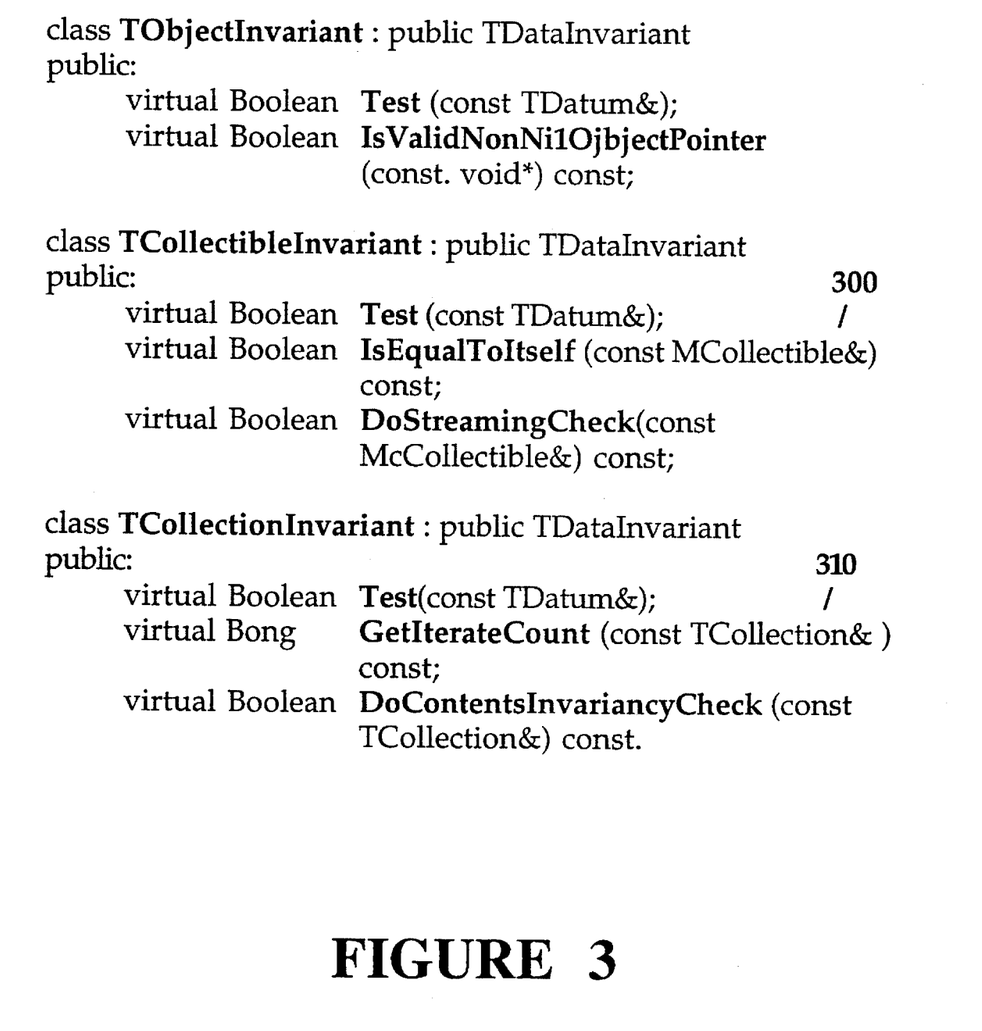
FIG. 3 is an invariant class declaration for generic objects in accordance with the subject invention.
Figure 4:
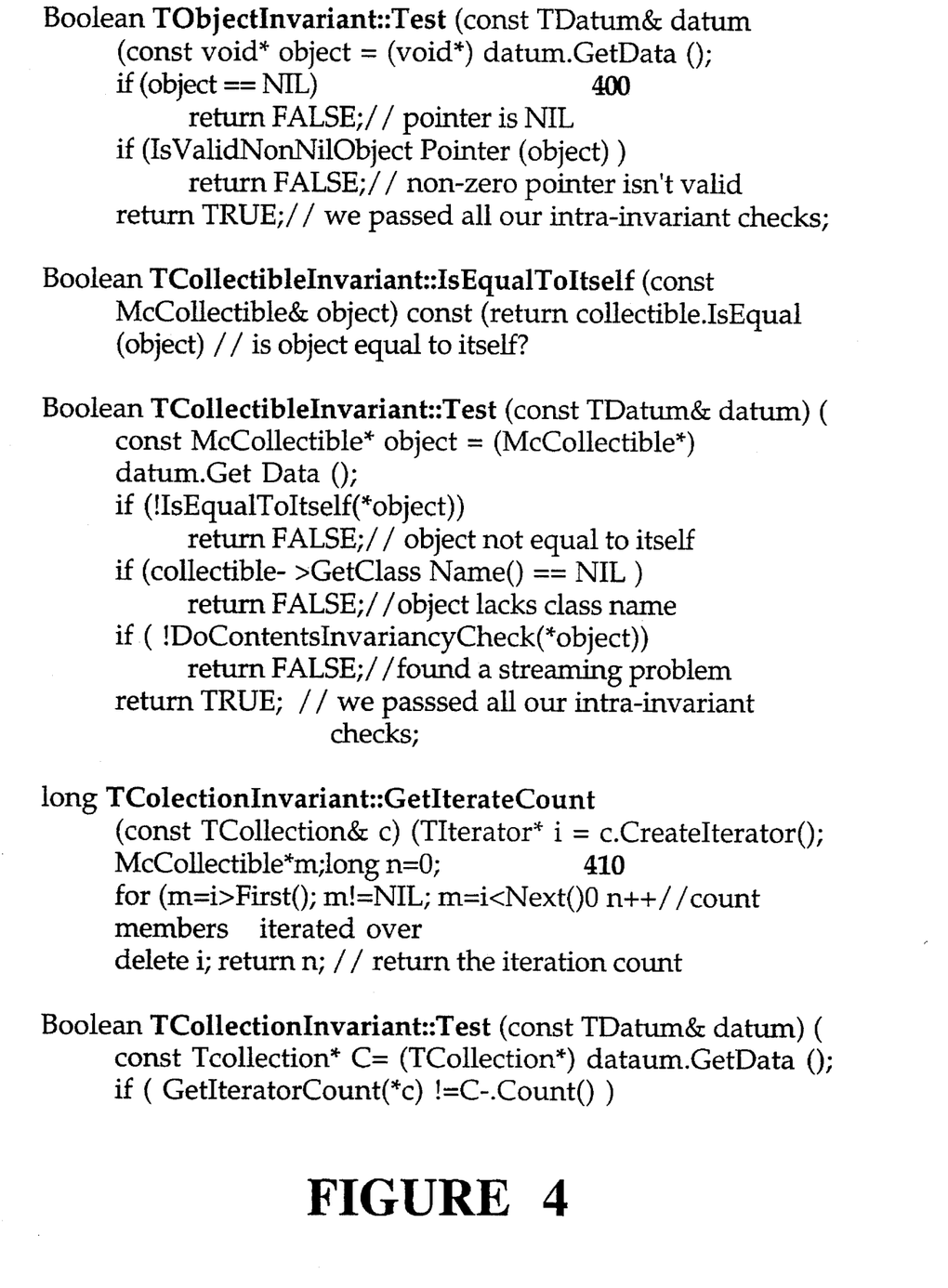
FIG. 4 is a nontrivial invariant method in accordance with the subject invention.

Data being evaluated for invariance are contained within data encapsulators descended from TDatum, the abstract base class for target data containers. A TDatum reference is passed as an explicit argument for invariance from the encapsulator. Consider the examples in FIG. 3 which illustrates a computer listing of an invariant class declaration for generic objects, MCollectibles 300 and TCollections 310. Note the presence of helper methods within each invariant class which are used to neatly partition the invariant sub checks used by the Test invariance evaluation. FIG. 4 illustrates nontrivial invariant method definitions.

Invariants usually consist of a series of checks, and if any check fails, then the invariant returns a result of false indicating that the target objects has an incorrect or unexpected state. Although these example invariant classes provide limited verification of MCollectibles and TCollection objects, they demonstrate that invariants can be concretely expressed using C++ subroutines.

Notice the lack of redundancy in FIG. 4 to between TCollectibleInvariant 400 and TCollectionInvariant even though a TCollection is a MCollectible. None of the MCollectible checks are performed within the TCollection invariant because the system automatically calls the TCollectibleInvariant on every TCollection before calling TCollectionInvariant. The TCollectionInvariant can always assume that the target object has passed all preceding invariants for MCollectible supertypes before being called.

Conditions

Conditions are predicates which assert the correctness of initial and final conditions for target subroutines explicitly called during test scenarios. There are two types of conditions: preconditions which assert if subroutines should work, and postconditions which assert if subroutines did work. Both play an important role in driving the automated testing process. Test engineers using the subject invention write pre and postconditions rather than test cases.

Target subroutines can be assigned a virtually unlimited number of conditions limited only by system resource constraints. Conditions for virtual methods assigned to supertypes are automatically inherited by overriding subtype methods. For example, when asserting conditions for TCollection::IsEqual, the conditions for MCollectible:: IsEqual are evaluated first. Then, the evaluation of conditions for TCollection:: IsEqual. Evaluation of multiple conditions is terminated immediately after a semantic violation has been detected.

Preconditions

Preconditions for subroutines determine if a specific system state and explicit parameter data set which satisfies the subroutine's syntactic protocol also satisfies the subroutine's semantic protocol. Preconditions are evaluated immediately before potential execution of a target subroutine in automated test scenarios. If all of the subroutine's preconditions assert that semantic protocol will be maintained, then the target subroutine can be executed with the specified data set and system state. If any of the preconditions assert that semantic protocol will be violated, then the subroutine will not be executed and the situation will be recorded for later analysis. Preconditions act as filters in the testing process to avoid target subroutine invocations that would violate semantic protocol and therefore could not be considered valid test scenarios.

Figure 5:
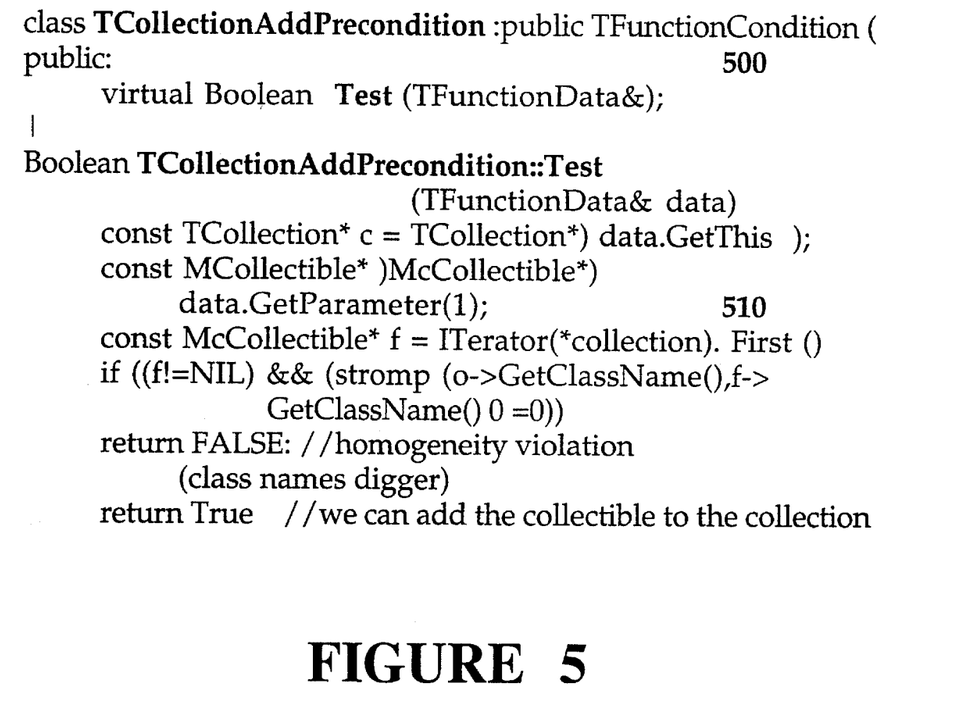
FIG. 5 illustrates an example precondition in accordance with the subject invention.

Preconditions are represented using subclasses of TFunctionCondition in the same manner that invariants use TDataInvariant. Simple preconditions only need to override a single Test method. Preconditions directly access data being passed to the target subroutine using a TFunctionData object which encapsulates all explicit parameters and a function result. FIG. 5 illustrates an example precondition for TCollection::Add at 500. The precondition's method definition appears at label 510.

Notice that there is no redundancy between to the TCollectionAddPrecondition and the invariants for MCollectible and TCollection. Before calling the precondition, the subject invention first calls the invariants using all explicit function data to assert their validity. The subject invention ensures that all data explicitly passed to a function condition have successfully passed their invariants. This automatic invariant checking simplifies condition development and provides consistency of conditions written by test engineers. If any of the function data are invalid, then neither the precondition or the target function Add is called.

If the function data are valid, then the precondition performs a semantic check to ensure that adding the MCollectible to the TCollection maintains the collection homogeneity using the following logic: if the collection is empty, then the collectible can be added to the collection; if the collection is not empty, then the collectible class type must be identical to the first collectible already in the collection. If all of these checks yield true, then the collectible can be correctly added to the collection.

Preconditions can also be used to cache information prior to subroutine execution for later postcondition retrieval. For example, when adding a collectible to a collection it may be necessary to record the number of members in the collection before the collectible is added, and record if the collectible was already a member of the collection. This information can be used by the postcondition to determine if the subroutine performed correctly.

Postconditions

Postconditions are evaluated immediately after execution of target subroutines to determine if semantic protocol was maintained and target subroutines operated correctly. Postconditions are primarily responsible for failure detection of target code and act as inspectors to determine when, where, and how failures arise during automated testing.

Figure 6:
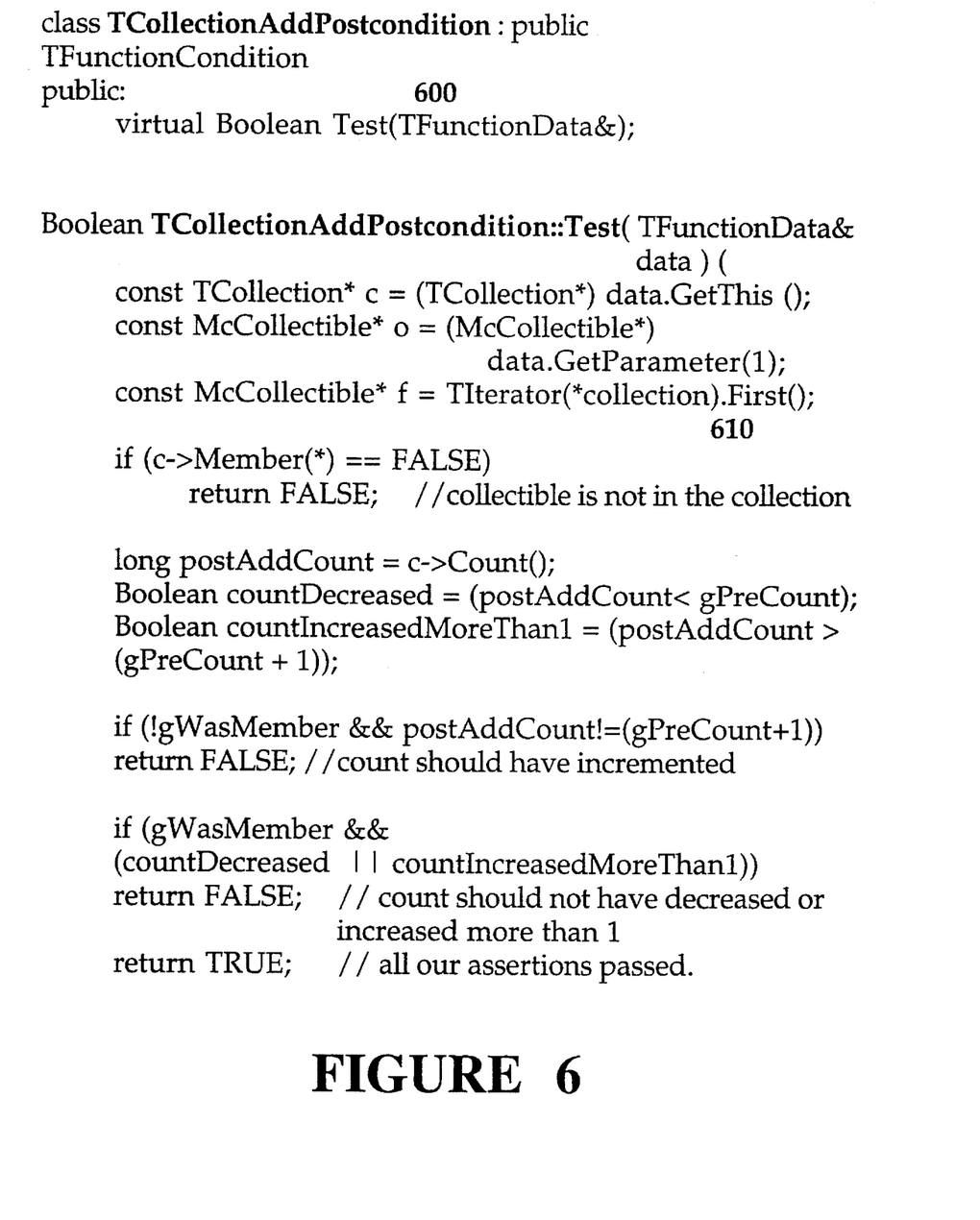
FIG. 6 is a postcondition class in accordance with the subject invention.

Using the TCollection::Add(MCollectible*) example, consider the following concrete postconditions which determine if a collectible has been correctly added to a collection given that the precondition asserting that semantic protocol would not be violated. FIG. 6 at label 610 illustrates a simple postcondition class for TCollection::Add.

The postcondition desires information concerning the precondition state to determine if the Add operated correctly: how many collectibles were already in the collection, and was the added collectible already in the collection? Although the subject invention provides a formal system for inter-predicate communication, assume that the precondition data is made available to the postcondition through global variables long gPreCount and Boolean gWasMember. The postcondition Test method has the following definition illustrated in FIG. 6 at 610.

First the postcondition checks the existence of the collectible within the collection, then it compares the number of collectibles in the collection to an expected value. If the collection count has either decreased or has increased by more than 1, then the postcondition returns false representing a semantic failure probably caused by an implementation defect in the target code. As the example illustrates in FIG. 6, the combination of syntactic and semantic protocol provide a useful means to express the behavior of simple classes or functions under test. The ability to share information between preconditions and postconditions offers considerable opportunity to determine if failures have arisen in target code.

Associates

Associates are user-defined rules which explicitly link predicates (invariants, preconditions and postconditions) to their intended test targets (classes and functions). Predicate objects by design are not explicitly associated with specific targets. Associates allow a single predicate class to be simultaneously associated with multiple targets. For example, associates allow TComparePrecondition to be associated with both MCollectible::IsEqual and TCollection::IsSame since both methods have a semantic protocol which requires that the single parameter object being compared must have a type identical to this.

Associates are provided by test engineers in the form of text statements in declaration scripts. For example, the following statements represent typical associations. use invariant TMyInvariant from MyTestLib for TBar, TFoo;use precondition TaddPrecondition for TCollection::Add(M Collectible*);

Since associates are interpreted using text declarations and applied at runtime, they provide the flexibility of highly dynamic linking without requiring recompilation of the source code.

Target Selectors

Selectors are objects that select targets in automated test scenarios. There are two primary types of selectors: function selectors, which select the next function to be tested, and data selectors which select the parameter data for the currently selected function under test. Two default selectors are provided: random selectors which pseudo-randomly select the ith out of N available targets, and exhaustive selectors which choose all candidate targets at least i times before choosing i+1 times.

Function Wrappers

Function wrappers are subroutines which are responsible for directly executing functions under test. Wrappers must unencapsulate target function parameter data, execute target functions, and reencapsulate the parameter and result data from function calls. Although test engineers do not see or use wrappers directly, to wrappers must be compiled and linked into target shared libraries by test engineers. The source code for wrappers are generated automatically by the subject invention using target source code syntax, and should be compiled into target libraries along with predicate classes. Wrapper function source code can be created using the create wrappers command.

Command Interpreter

The primary user interface to the subject invention is the command interpreter, also known as CI. The command interpreter is a text-based, remote controller for development. User directives can be entered from CI or indirectly via a console command which instructs the subject invention to read additional commands contained within a script file.

There are two categories of directives that the subject invention interprets: commands which interactively control test execution anddeclarations which define the properties of the test targets. The subject invention currently has two independent LeX/Yacc-based parsers for interpreting commands and declarations which causes a divergence between use of the two types of directives: commands can be presented directly by using CI or indirectly within script files, but declarations are always presented indirectly within script files.

There are two distinct stages which test engineers must traverse to test their code using the subject invention. In the first stage they must develop predicate classes for their code and build shared libraries containing predicate code and wrapper functions. In the second stage engineers test their target code using scripts or interactively with a human/computer interface.

There are six major steps in the setup for the subject invention testing.

(1) target code is identified,
(2) predicate classes are written for target code,
(3) associates are written which bind predicates to test targets,
(4) the subject invention learns target rules,
(5) the subject invention creates target wrappers,
(6) predicate and wrapper sources are compiled, linked, and built into a target shared library.

Figure 7:
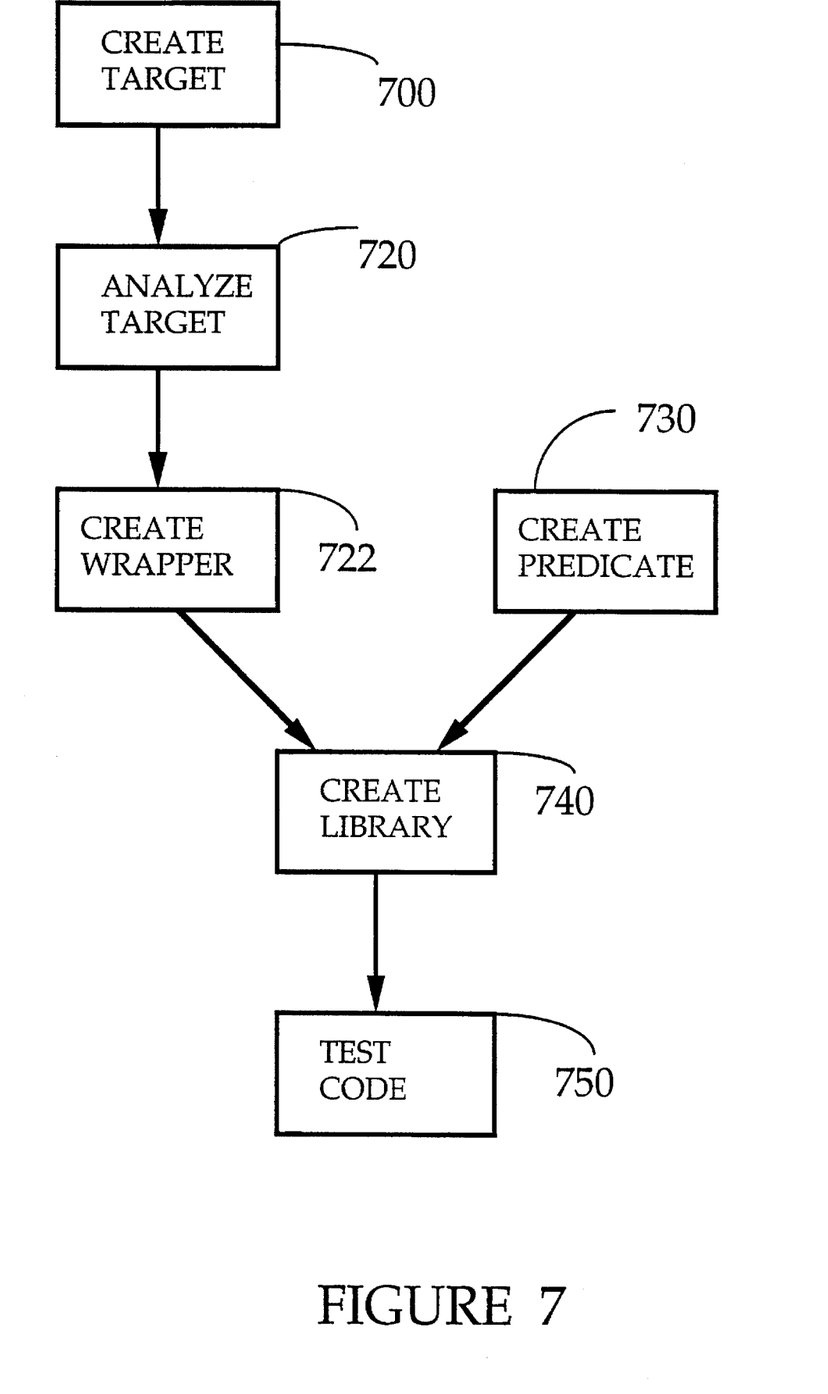
FIG. 7 is a block diagram of major steps in accordance with the subject invention.

FIG. 7 represents the major steps in the setup stage. The processing commences at function block 700 where the designer creates target declarations and inputs them into the subject invention. The invention analyzes the target declarations as depicted in function block 720 and creates target wrappers as depicted in function block 722. Then the tester creates predicates as shown in function block 730 and inputs the predicates and the wrappers into function block 740 where the tester creates a shared library from the predicates and the wrappers. Finally, at function block 750, the target shared library is used for testing the application in accordance with the subject invention.

Develop Class Invariants

Each target class should be accompanied by one or more invariants which assert the correctness of a target class object's state during automated testing.

Function Conditions

Every public member function in the target code is accompanied by one or more preconditions which accurately and thoroughly assert its semantic pre- and postconditions.

Predicate Associations

All invariants and conditions need to be accompanied by associations which bind predicates to their intended test targets. Associations appear in a declaration script. An example script appears in the following section.

Preconditions filter out candidates that are not appropriate for a particular design from an automatically generated pool of type-legal candidates. Preconditions are concrete functions in C++ which return either true or false to represent the legality of a candidate subroutine or datum. For example, the SetName precondition returns true if a TName candidate consists of the characters A–Z.

FIG. 8 illustrates how a precondition filters out design-illegal cases from a type-legal test domain. Virtually infinite valid test domains can be created by using preconditions to filter out invalid scenarios from automatically generated type-legal, possibly design-legal domains. This technique provides unparalleled efficiency compared to manually writing test cases. However, target subroutines must have corresponding preconditions which are written by test engineers.

Technical writers and client developers benefit from precondition functions because such functions precisely state conditions that must be met before a subroutine can be called. Tech writer can create concise English instructions by disassembling precondition statements. This benefit is particularly advantageous when the preconditions statements in C++ are expressed using high-level expressions.

Postconditions

Postconditions determine when failures arise during test domain exploration. They are similar to preconditions except postconditions are evaluated after each explicit subroutine call. Test engineers write postcondition functions which verify that each test subroutine call has operated according to its specification. For example, the postcondition for TPerson::SetName might verify that the TPerson name is identical to the TName instance passed as a parameter in the previous SetName call. Like preconditions, all target subroutines in the API usually have corresponding postconditions.

Object Testing

Object frameworks offer testing challenges such as inheritance correctness, polymorphic substitution, and object operations such as construction, destruction, copying, assignment, streaming, and comparison over the standard procedural testing problems. The subject invention offers built-in features to automatically verify many of these object-oriented features. Preconditions and postconditions which are assigned to pure virtual methods in superclasses are automatically inherited by concrete subclass methods. Supertype invariants are automatically called in order of precedence when checking the integrity of subtype objects.

Invariants are called before and after subroutines to check correct streaming and cloning for diverse object states which would be difficult to reproduce in unit tests.

The following sections explain how the subject invention's implementation offers innovative and new techniques to resolve several of the reliability and testing issues presented earlier.

Standard Test Specification

Since the subject invention algorithmically analyzes data type relationships to generate test domains, identical test cases for any API will be generated regardless of the test engineer involved. Two or more test engineers of differing abilities given the same API will generate identical test cases for that API. This capability offers a systematic solution to fundamental problems for both unit and integration testing. In traditional testing, the human effort required to test an API has been difficult to predict. Often effort was proportional to the number of test cases which must be written, but it was sometimes impossible to compute the number of cases analytically. With the subject invention, the human effort required to test is directly proportional to measurable characteristics of the API under test.

The human effort required is directly related to the number of precondition, postcondition, and invariant functions which must be written. Of course, this model assumes that all functions require the same effort for all APIs, which is not a valid assumption since some APIs are much more complex than other.

However, once a probability distribution of the effort (probably in person-minutes) required to write these functions has been gathered, the total human effort required to begin testing an arbitrary API can be estimated using simple statistics.

Automatic Test Case Generation

As mentioned earlier, the subject invention generates test cases automatically when exploring the test domain of an API. This implies that no test cases need rewriting after an API to has been modified. However, the precondition, postcondition, and invariant functions for an API might require modification.

Software Reliability Measurement

Reliability can be automatically measured during testing sessions by keeping track of the time spent in explicitly called subroutines under test, and counting the number of failures which have occurred. The mean time between failures (MTBF) can be automatically determined because both the time under test and the number of failures is maintained during automated testing sessions. The software reliability can be estimated for any API by statistically analysing results of multiple random walk through employing the API's design-legal test domain.

Having test engineers write preconditions, postconditions, and invariants is a more efficient strategy than hand-coding test cases, particularly as greater numbers of cases are needed when testing becomes more rigorous and errors become less frequent. Testing of object-oriented APIs is accommodated by determining type inheritances to allow polymorphic candidate date selection, and precondition/postcondition/invariant inheritance for the code under test. Reuse of objects across sequential messages (method calls) offers complex test scenarios which would be virtually impossible to create using independent unit tests.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. An apparatus for use with a computer system, including a central processing unit, for testing an application program comprised of a plurality of components, each of the plurality of components operating on parameter data and producing output values therefrom, the apparatus comprising:

(a) storage means controlled by the central processing unit and cooperating with the computer system to store the application program;

(b) means for storing predicate rules for detecting invalid data, the predicate rules comprising precondition rules for detecting semantically invalid parameter data and postcondition rules for detecting invalid output values generated by one of the plurality of components;

(c) means responsive to the stored application program and to the stored predicate rules for compiling the predicate rules and the application program to generate an executable program module, an executable precondition module and an executable postcondition module in a common library;

(d) means for generating a pool of syntactically correct parameter data from a lexical analysis of the application;

(e) means responsive to the pool of parameter data for applying the parameter data to the precondition module to remove semantically invalid parameter data therefrom and for applying parameter data remaining in the pool of parameter data to each of the plurality of components to generate output values; and (f) means controlled by the central processing unit and responsive to the output values for applying the output values to the postcondition module to detect invalid output data.

2. The apparatus as recited in claim 1 further comprising controlling means for generating an executable wrapper module for controlling the executable program module to operate on the parameter data remaining in the pool of parameter data after processing by the precondition module.

3. The apparatus as recited in claim 1 wherein the precondition rules define parameter data on which the application program can operate without generating an error.

4. The apparatus as recited in claim 3, wherein the predicate rules include invariant means for detecting whether the parameter data has a valid state and the postcondition rules include means for detecting whether the output values indicate that semantically valid actions were performed by the plurality of components.

5. The apparatus as recited in claim 1 wherein each piece of the parameter data is one of a plurality of data types and wherein each of the predicate rules is written for one of the plurality of date types and the apparatus further comprises associate means for associating each piece of the parameter data having a particular data type with one of the predicate rules that is written for the particular data type.

6. The apparatus of claim 1 wherein the precondition rules include means for storing parameter information identifying parameter data applied to the preconditional rules and component information identifying ones of the plurality of components being tested and wherein the postcondition rules include means for accessing the stored parameter information and the stored component information to determine which parameter data and components were used to generate the output values.

7. The apparatus of claim 1 wherein the precondition rules and the postcondition rules are object classes and wherein the means for applying the parameter data to the precondition rules includes means for instantiating a precondition rule object from the precondition class and for applying the parameter data to the precondition rule object, and wherein the means for applying the output values to postcondition rules, includes means for instantiating a postcondition rule object from the postcondition rule class and for applying the output values to the postcondition rule object.

* * * * *